United States Patent [19]

Boyd

[11] Patent Number: 4,486,073

[45] Date of Patent: Dec. 4, 1984

[54] RADIANT ENERGY REFLECTING STRUCTURES

[76] Inventor: Michael D. Boyd, 4 Dirrawan Gardens, Reid, A.C.T., Australia

[21] Appl. No.: 186,859

[22] Filed: Sep. 15, 1980

Related U.S. Application Data

[63] Continuation-in-part of Ser. No. 917,370, Jun. 20, 1978, abandoned, which is a continuation-in-part of Ser. No. 746,844, Dec. 2, 1976, abandoned.

[51] Int. Cl.$^3$ .......................... E06B 9/26; G02B 5/12; G02B 5/126

[52] U.S. Cl. ................................ 350/103; 160/166 R; 160/236; 350/104

[58] Field of Search ............... 160/166 R, 178 R, 236; 350/97, 102, 103, 263, 276 R, 292, 104, 105

[56] References Cited

U.S. PATENT DOCUMENTS

| | | | |
|---|---|---|---|
| 1,271,800 | 7/1918 | Sutton | 160/236 |
| 2,067,701 | 1/1937 | James | 350/103 X |
| 2,103,788 | 12/1937 | Mohrfeld | 160/236 |
| 2,161,842 | 6/1939 | Allison | 350/103 X |
| 2,555,715 | 6/1951 | Tatum | 350/105 |
| 2,568,126 | 9/1951 | Keeley | 350/105 X |
| 3,540,282 | 11/1970 | Köhler et al. | 350/97 X |
| 3,614,199 | 10/1971 | Altman | 350/105 |
| 3,818,218 | 6/1974 | Heenan | 350/103 X |
| 3,887,268 | 6/1975 | Golden et al. | 350/103 X |
| 3,984,175 | 10/1976 | Suhr et al. | 350/103 |
| 3,993,401 | 11/1976 | Stehlow | 350/97 X |
| 4,069,787 | 1/1978 | Wyckoff | 350/104 X |
| 4,082,426 | 4/1978 | Brown | 350/97 X |
| 4,113,351 | 9/1978 | Kitrell | 350/97 X |

FOREIGN PATENT DOCUMENTS

| | | | |
|---|---|---|---|
| 1135369 | 4/1957 | France | 160/236 |

*Primary Examiner*—Rodney H. Bonck
*Attorney, Agent, or Firm*—Zarley, McKee, Thomte, Voorhees & Sease

[57] ABSTRACT

Radiant energy reflecting structures are described which are elongate and which have a plurality of reflecting elements on or in their surface. Each reflecting element has a "major axis" of reflection (the term "major axis" is defined in this specification), and a feature of the reflecting structures is that the direction of the "major axis" varies progressively with the transverse position of a reflecting element on the structure. The reflecting surfaces of the reflecting elements may be formed as corrugated, elongate, planar reflectors. Alternatively they may be formed as a known form of retro-reflective surface construction. Preferably, the reflecting surfaces are overlaid with a transparent medium. The structures may be used to construct louvred radiant energy screens.

10 Claims, 14 Drawing Figures

RADIANT ENERGY REFLECTING STRUCTURES

This is a continuation-in-part of my U.S. patent application Ser. No. 917,370, filed June 20, 1978, now abandoned, which is a continuation-in-part of application Ser. No. 746,844 filed Dec. 2, 1976, now abandoned.

This invention relates to radiant energy reflecting devices, and in particular concerns a radiant energy reflecting member which can be used to form a solar energy barrier or screen having a plurality of reflecting members which are disposed in such a manner as to prevent the penetration of unwanted energy by reflection into a shaded space. The invention has particular, but not exclusive, application to solar energy screens which are constructed as louvred screens, latticed screens or folded or gathered screens. The term "louvred screens" will generally be understood to include venetian blinds, louvred storm windows, and louvred doors and shutters.

Other areas of application of the present invention include grilles to allow the passage of fluid media, but not radiant energy, for example, ventilation grilles for equipment and for buildings.

The reflecting member of the present invention utilises certain aspects of one form of "retro-reflection" of energy. Retro-reflectors are reflecting bodies which reflect incident radiation back in the direction from which it is incident. They generally take one of three basic forms, namely (a) two or three planar reflectors at right angles to each other, (b) a lens with a mirror in its focal plane, and (c) a concave mirror with a smaller mirror at or near its focus. Each of these basic forms may be either a first-surface reflector (in which reflection occurs on the front face of the reflector) or a second-surface reflector (in which the incident radiation penetrates a transparent material, the front surface of which constitutes the first face, and reflection occurs at the second or rear face of the transparent material). The present invention has a number of similarities to these types of retroreflector surfaces, but the distinction between such surfaces and the present invention will become apparent as the description proceeds.

In more detail, the property of retro-reflection is exhibited where two reflectors are placed at right angles to each other. An incident energy ray in any plane which is reflected from one reflector to the other will be reflected in a parallel (but displaced) plane. Furthermore, if three reflectors are placed at right angles to each other (so as to form the internal corner of a cube), an incident energy ray which is reflected sequentially from each of the three reflectors, will be reflected in a parallel (but displaced) path. Such reflectors are known variously as retro-reflectors, retro-directive mirrors, and cube-corner reflectors. This principle is further described, for example, in the "Encyclopedia of Science and Technology" published by the McGraw-Hill Book Company, Inc., in 1960 under the heading "Mirror Optics".

The closest prior art to the present invention is believed to be the venetian blind assembly illustrated in U.S. Pat. No. 2,103,788 (to Mohrfeld). That specification discloses a slat for venetian blinds and the like in which one surface of the slat has a plurality of longitudinally extending, adjoining, narrow, highly reflecting surfaces disposed at an angle of approximately 45° to the plane of the slat and at angles of approximately 90° to each other. Such a surface comprises a two-plane, first-surface retro-reflector as discussed above, and such a surface does operate to reduce the amount of solar energy penetrating into a space shaded by the venetian blind. However, blinds constructed in accordance with Mr. Mohrfeld's design suffer from a disadvantage; they permit inward re-reflection of incident energy (as will be shown later).

Re-reflection of incident energy into the shaded space is also a problem with highly reflective surfaces.

It is a prime objective of the present invention to provide a radiant energy reflecting member which can be used in venetian blinds and the like and which are effective to reduce the transferrence of radiant energy into the shaded space by re-reflection.

According to the present invention, there is provided a radiant energy reflecting member comprising (a) an elongate body; and (b) a plurality of reflecting elements formed in or attached to said body, said elements being located adjacent to each other and having a major axis of reflection (as hereinafter defined), said elements being arranged so that the direction of the major axis of each element varies progressively with the transverse position of the element on said body.

Also according to the present invention, there is provided a reflecting member comprising (a) an elongate body; and (b) a plurality of reflecting elements formed in or attached to said body, said elements being located adjacent to each other with their longitudinal directions parallel to the longitudinal direction of said body, each of said elements comprising a group of planar reflecting surfaces inclined relative to each other and having a major axis of reflection (as hereinafter defined), said elements being arranged so that the direction of the major axis of each element varies progressively with the transverse position of the element on said body.

Preferably the elements each comprise a pair of elongate reflecting surfaces inclined relative to each other. Also, the elongate body is preferably a lamellar body.

In another aspect of the present invention, there is provided a radiant energy screen assembly comprising a plurality of radiant energy reflecting members of the present invention, having lamellar bodies, arranged in a louvre configuration. This aspect of the present invention is especially useful for the construction of light- and heat-screen assemblies such as blind assemblies, particularly venetian blind assemblies, for the exterior windows of buildings.

The present invention, as will be seen, also encompasses radiant energy reflecting members of the type defined above, in which a layer of transparent material is located on top of the reflecting surfaces of the reflecting elements.

The radiant energy reflecting members of the present invention may be formed in any suitable manner, including rolling, casting or stamping the desired reflective surface configuration into a body, such as venetian blind strip material, and subsequently (if necessary) applying a coating of a reflective material. Other methods of forming the radiant energy reflecting members will be described later.

To further understand the present invention, this description will now continue with reference to the accompanying drawings, in which:

FIG. 1 illustrates a portion of a known form of radiant energy reflector device, namely the venetian blind slat construction chosen by Mohrfeld for the screen illustrated and described in his U.S. Pat. No. 2,103,788;

Figure 1:
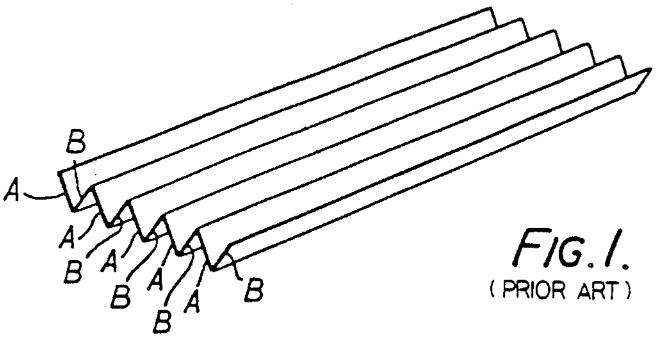
FIG. 1. (PRIOR ART)
Figure 2:
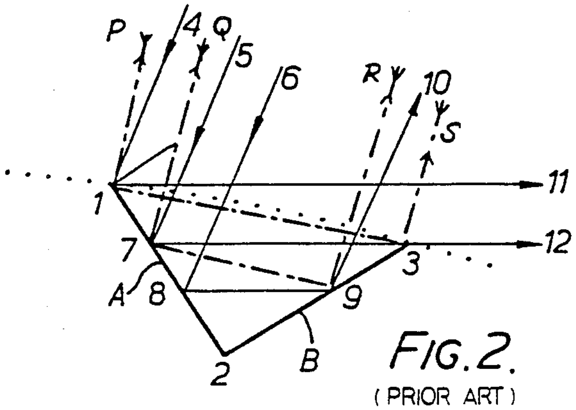
FIG. 2. (PRIOR ART)
FIG. 2 illustrates the retro-reflective property of the surface of the embodiment of FIG. 1, and its failure to be retro-reflective in general.

Referring firstly to FIG. 1, there is shown a two-plane first-surface retro-reflective device which consists of a longitudinally corrugated aluminium reflector having reflective surfaces A and B disposed substantially at right angles to each other. Referring to FIG. 2, which is a cross-section through two reflective surfaces of the device of FIG. 1, it will be seen that, in general, when a beam of energy is incident upon the reflective surface, a portion of the beam, typified by the illustrated beam path 6-8, it will be reflected from the surface A to the surface B along the path 8-9 and, on re-reflection from the surface B, will emerge from the reflector along path 9-10 in a parallel plane. It will also be apparent from FIG. 2 that another portion of the beam of energy incident upon the reflective surface, typified by beam paths 4-1 and 5-7, will be reflected once only to be scattered in direction 1-11 and 7-12. Thus it can be seen from this Figure that in general, only a portion of an incident beam of energy is truly retro-reflected, unless the incident beam strikes at one particular angle, which is illustrated by rays P-1-3-S and Q-7-9-R. Because the rays P-1-3-S and Q-7-9-R are totally retro-reflected rays, and incident beams from all other direction are only partially retro-reflected, I have termed the direction from which beams P, Q, R and S are incident the "major axis" of the reflector (those familiar with reflecting surfaces will recognise that, in the case of the slat of FIG. 1, the "major axis" is a pencil beam, having cross-sectional dimensions which correspond to the peripheral shape of the slat, and whose direction is at right angles to the slat).

In general, the "major axis" of a reflecting surface or reflecting structure is, at any point on that surface or structure, the direction from which every beam of electro-magnetic energy having a wavelength in the visible, near infra-red and near ultra-violet regions of the spectrum, will be fully retro-reflected by the surface.

Figure 3:
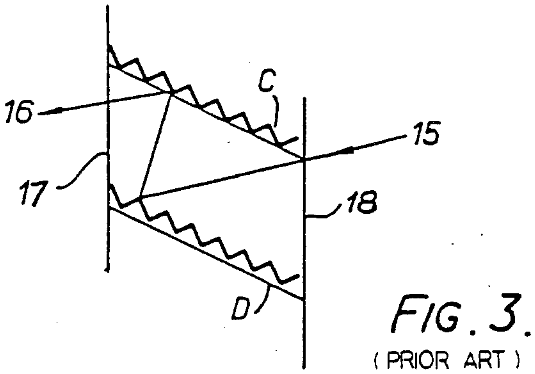
FIG. 3. (PRIOR ART)
FIGS. 3 and 4 illustrate possible re-reflection paths for incident radiant energy in louvred screen devices which incorporate slats having the structure of FIG. 1.
Figure 4:
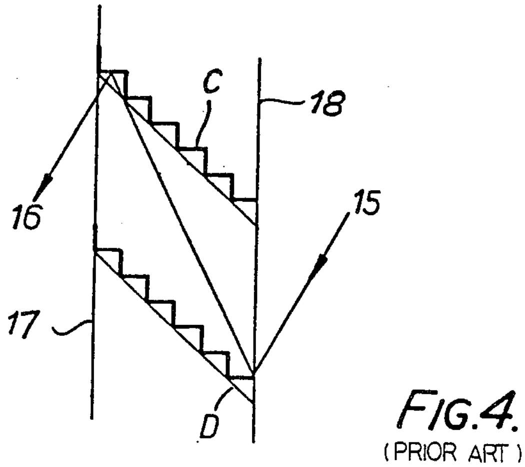
FIG. 4. (PRIOR ART)

FIGS. 3 and 4 illustrate a venetian blind constructed of slats having the shape illustrated in FIG. 1, positioned between imaging inner and outer surfaces, 17 and 18, respectively. From these Figures it can be seen how undesirable re-reflection of incident energy can occur. FIG. 3 illustrates a case in which slats C and D are oriented so that a ray entering along path 15 is deflected from one slat to the next and into the shaded space along path 16. Similarly, referring to FIG. 4, it can be seen that such undesirable re-reflection into the shaded space may take place when a high elevation beam 15 strikes the outer end of the reflector surface D. It can be seen from these diagrams that, in practice, inward re-reflections from a low sun angle (FIG. 3) occur as a result of a beam such as beam 4-1-11 in FIG. 2.

I have found that such single reflections from louvred screens having this type of slat construction can be reduced if the reflecting facets on the edge of the screen slats on the shaded side of the screen are reduced from the profile 1-2-3 of FIG. 2 to, for example, profile 7-2-3 of FIG. 2, and the reflecting facets on the other edge of the screen slats are simultaneously reduced from profile 1-2-3 of FIG. 2 to, for example, profile 1-2-9 of FIG. 2. That is, reflection of energy into the shaded space will be reduced if the slats which constitute the reflecting members of a louvred screen are shaped so that the "major axes" of the reflecting members vary progressively across the width of the screen. Clearly a similar result is obtained if a reflecting structure which is not a corrugated lamellar body, but nevertheless has a varying "major axis", is used for the slats.

Figure 5:
FIGS. 5 and 6 are cross-sectional representations of alternative embodiments of radiant energy reflecting members constructed in accordance with the present invention.
Figure 6:

FIGS. 5 and 6 illustrate alternative embodiments incorporating such new reflecting members. FIG. 5 illustrates a corrugated retro-reflective construction in which the included angles between reflecting elements remain unaltered at approximately 90°, but the element widths are varied so that the energy reflecting member has a curved profile. The reflective sturcture shown in FIG. 6 is also corrugated but the reflective surfaces are constructed so that the upper included angle between the reflective elements is 90° only at the mid-width point of the lamellar structure. In this embodiment, alternate reflective facets no longer lie in parallel planes.

Figure 8:
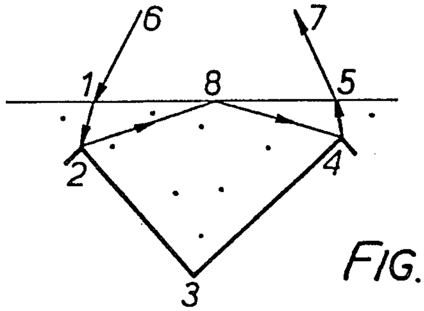
FIGS. 7 and 8 illustrate a radiant energy reflecting member, constructed in accordance with the present invention, in the form of a second surface reflector.
Figure 7:
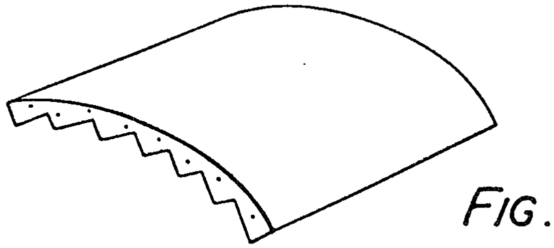

FIGS. 7 and 8 illustrate a further embodiment of the present invention, in which each reflecting element is a two-plane second-surface reflector. This structure may conveniently be formed by extruding a transparent venetian blind slat with the corrugations on the underside, configured in accordance with the principles illustrated in FIGS. 5 and 6, then coating the underside of the slat with a reflective film. FIG. 8 is a cross-section through such a reflecting element and illustrates that a ray incident along path 6-1, strikes the surface of the transparent material at point 1, and is refracted along path 1-2. It is then reflected along path 2-8 to point 8 on the surface, where it is totally internally reflected. It then strikes the reflecting surface at 4 and leaves the structure along path 5-7 at a different angle to the ray emerging along path 1-11 of FIG. 2, but nevertheless at an angle which would be effective to prevent energy penetrating a louvred screen having slats made in this fashion by re-reflection, as shown in FIGS. 3 and 4. Thus, by utilising this form of reflecting member, the undesirable reflections illustrated in FIGS. 3 and 4 may be further reduced or eliminated.

Figure 9:
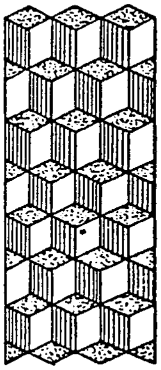
FIGS. 9 and 10 illustrate a retro-reflective surface utilising a cube-corner reflector.
Figure 10:
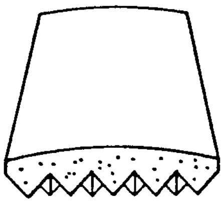

Turning now to FIGS. 9 and 10, there is shown a known form of three-plane, first-surface (FIG. 9) and second-surface (FIG. 10) reflector structure, namely an array of "cube-corner" reflectors, which may be embodied in a curved venetian blind slat to form a radiant energy reflecting member of the present invention. When compared with similar two-plane reflectors, the reflecting structures of these Figures exhibit the further advantage that reflected incident energy is reflected in a parallel line, and not a parallel plane. Once again, this form of reflecting surface may be overlaid with a transparent medium, thus utilising the principles discussed above in relation to the embodiment of FIGS. 7 and 8.

Figure 11:
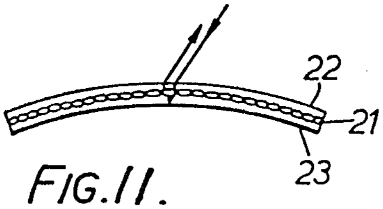
FIGS. 11 to 14 illustrate further slat constructions, utilising lens/focal plane mirror retroreflectors and concave mirror/secondary mirror retroreflectors, which the present inventor has designed.

It is also possible for energy reflecting members of the present invention to be constituted by a curved lens/focal plane mirror construction. As with two-plane and three-plane reflecting structures, these can provide retro-reflectivity in two dimensions (for example, in the form of an extruded transparent curved sheet with lens-profile surfaces, mounted over a mirror-surfaced base member) or in three dimensions (for example, in the form of an array of glass spherical beads, suspended over a curved reflective surface). FIG. 11 illustrates one such configuration in which elements 21 are transparent rods or spheres set in a matrix 22 of lesser refractive index, above a reflective base member 23. They may be first-surface reflective, (therefore with the reflector separate from the lens) or more commonly second-surface reflective, with the reflector attached to the rear of the lens system (for example, as shown in FIG. 11). The advantage of such a reflecting structure is that non retro-reflection of the type illustrated in FIGS. 2 and 8 does not occur.

Figure 12:
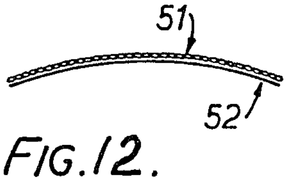

FIG. 12 illustrates a modified form of the venetian blind slat of FIG. 11. The slat of FIG. 12 has an outer surface 51 comprising a matrix of glass bead lens element located in the surface of a transparent medium, above a reflecting surface 52.

Figure 13:
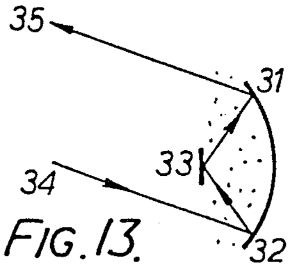
Figure 14:
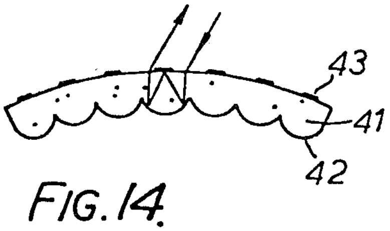

The last form of energy reflecting member illustrated in the drawings is a curved lamellar body constructed as a concave mirror/secondary mirror retro-reflector (for example, a "cats-eye" retro-reflector). In FIG. 13, a concave mirror 31-32, which may be circular or parabolic in cross-section, has a small mirror 33 near its focus. A typical ray path 34-32 is retro-reflected through 180° to emergy along ray path 31-35. As with other retro-reflector types, these embodiments may be two-directional with longitudinally extending mirrors of constant cross-section, or they may be three dimensional, with primary mirrors formed of sphere segments, thus providing total retro-reflectivity rather than planar retro-reflectivity. In addition, reflection may be either first or second surface reflection, although the preferred form for the present application would be as second surface reflectors. FIG. 14 is a cross-section through a venetian blind slat, in which 41 is the transparent body of the slat, elements 42 are a series of concave reflectors formed on the rear of the slat, and elements 43 are small secondary reflectors formed on the transparent face of the slat.

Finally, it should be noted that since the energy reflecting members of the present invention are effective to reduce the transmission of energy by re-reflection when incorporated into louvred screens, it is possible to make the inward facing surfaces of such screens highly reflective, hence lowering their emissivity.

While the present invention has been described herein with reference to preferred embodiments, it will be generally understood by persons skilled in the art that various changes may be made and equivalents substituted for elements thereof without departing from the true spirit and scope of the present invention.

I claim:

1. A radiant energy reflecting member comprising:

an elongate body; and a plurality of elongate retro-reflecting elements formed in or attached to said body, said elements being located adjacent to each other with their longitudinal directions parallel to the longitudinal direction of said body, each of said elements comprising a pair of elongate reflecting surfaces inclined relative to each other, each of said elements having a major axis of reflection, said elements being arranged so that the directions of the major axes of the elements vary progressively with the transverse position of the elements on said body;

the surface of the body being formed into a corrugated surface so as to form said retro-reflecting elements with the distance between the peaks of adjacent corrugations varying progressively transverse the body;

the peaks of said corrugations laying in a first surface and the troughs of the corrugations laying in a second surface which is parallel to said first surface.

2. A reflecting member as defined in claim 1, in which the included angle between the reflecting elements varies progressively transversely across said body and said first and second surfaces are substantially planar.

3. A reflecting member as defined in claim 1, in which said first surface is arcuate in a direction transverse said body and both the included peak angles of the corrugations and the included trough angles of the corrugations are substantially 90°.

4. A reflecting member as defined in claim 1, in which said corrugations are filled with a transparent medium, to thereby form a smooth outer surface of said body.

5. A reflecting member as defined in claim 4, in which the outer surface of said transparent medium extends beyond said first surface in which the peaks of the corrugations lay.

6. A reflecting member as defined in claim 5, in which said body portion is a sheet of said transparent medium and said elements are established by forming the inverse of said corrugations in one surface of said sheet and establishing a reflecting surface in contact with said inversely-formed corrugations.

7. A reflecting member as defined in claim 6, in which the establishment of said reflecting surfaces is effected by depositing a reflecting material on said inversely formed corrugations.

8. A reflecting member as defined in claim 1, in which said body is a lamellar body.

9. A radiant energy reflecting member comprising:

a elongate body; and a plurality of elongate retro-reflecting elements formed in or attached to said body, said elements being located adjacent to each other, each of said elements having a major axis of reflection, said elements being arranged so that the directions of the major axes of the elements vary progressively with the transverse position of the elements on said body;

each element comprising a concave mirror at the focus of which is located a small planar mirror

10. A radiant energy reflecting member as defined in claim 9, in which said concave mirror is an elongate mirror, the cross-sectional shape of the reflecting surface of which is parabolic, and said small planar mirror is an elongate planar mirror mounted at the elongate focus of the parabolic reflecting surface.

* * * * *